(12) United States Patent
Fan et al.

(10) Patent No.: US 10,979,654 B2
(45) Date of Patent: Apr. 13, 2021

(54) IMAGE SIGNAL PROCESSING METHOD AND SYSTEM

(71) Applicant: HANGZHOU HIKVISION DIGITAL TECHNOLOGY CO., LTD, Hangzhou (CN)

(72) Inventors: Meng Fan, Hangzhou (CN); Hai Yu, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 526 days.

(21) Appl. No.: 15/755,862

(22) PCT Filed: Aug. 3, 2016

(86) PCT No.: PCT/CN2016/093076
§ 371 (c)(1),
(2) Date: Feb. 27, 2018

(87) PCT Pub. No.: WO2017/036270
PCT Pub. Date: Mar. 9, 2017

(65) Prior Publication Data
US 2018/0338092 A1 Nov. 22, 2018

(30) Foreign Application Priority Data
Aug. 28, 2015 (CN) .......................... 201510540746.6

(51) Int. Cl.
H04N 5/265 (2006.01)
H04N 9/04 (2006.01)
(Continued)

(52) U.S. Cl.
CPC ........... *H04N 5/265* (2013.01); *G06T 3/0075* (2013.01); *G06T 5/50* (2013.01); *G06T 7/90* (2017.01);
(Continued)

(58) Field of Classification Search
None
See application file for complete search history.

(56) References Cited

U.S. PATENT DOCUMENTS 7,620,265 B1 11/2009 Wolff et al.
2008/0170800 A1 7/2008 Bergman et al.
(Continued)

FOREIGN PATENT DOCUMENTS

CN 102075683 A 5/2011
CN 102461156 A 5/2012
(Continued)

OTHER PUBLICATIONS

Extended European Search Report for EP application No. 16840699.9 dated May 22, 2019, 17 pages.
(Continued)

*Primary Examiner* — James M Anderson, II
(74) *Attorney, Agent, or Firm* — Seed Intellectual Property Law Group LLP

(57) ABSTRACT

The present application discloses a method and system for processing image signals, the method and system sensing visible light bands of optical signals in an area to be imaged, via a first imaging unit, to generate a first image signal, wherein the first image signal includes color information; sensing at least infrared bands of optical signals in the area to be imaged, via a second imaging unit, to generate a second image signal, wherein the second image signal includes illumination information; and synthesizing the first image signal and the second image signal to generate a (Continued)

synthesized image with color information and illumination information. The present application can generate a synthesized image with a variety of advantages, and can meet the two monitoring requirements in low illumination and haze environment which are focused in the field of security.

16 Claims, 6 Drawing Sheets

(51) Int. Cl.
    *H04N 5/232*     (2006.01)
    *H04N 5/33*     (2006.01)
    *G06T 5/50*     (2006.01)
    *H04N 5/243*     (2006.01)
    *H04N 1/387*     (2006.01)
    *G06T 7/90*     (2017.01)
    *G06T 3/00*     (2006.01)
    *H04N 5/04*     (2006.01)
    *H04N 5/235*     (2006.01)
    *H04N 5/247*     (2006.01)
    *H04N 9/64*     (2006.01)

(52) U.S. Cl.
CPC .............. *H04N 1/3871* (2013.01); *H04N 5/04* (2013.01); *H04N 5/2351* (2013.01); *H04N 5/2354* (2013.01); *H04N 5/23232* (2013.01); *H04N 5/243* (2013.01); *H04N 5/247* (2013.01); *H04N 5/332* (2013.01); *H04N 9/04* (2013.01); *H04N 9/646* (2013.01); *G06T 2207/10024* (2013.01); *G06T 2207/10048* (2013.01); *G06T 2207/20221* (2013.01); *G06T 2207/30168* (2013.01); *G06T 2207/30232* (2013.01)

(56) References Cited

U.S. PATENT DOCUMENTS

| | | |
|---|---|---|
| 2008/0284880 A1 | 11/2008 | Numata |
| 2010/0045809 A1* | 2/2010 | Packard .................. H04N 5/332 348/222.1 |
| 2011/0052029 A1 | 3/2011 | Connah et al. |
| 2013/0002882 A1* | 1/2013 | Onozawa ................ H04N 5/332 348/164 |
| 2014/0168444 A1 | 6/2014 | Bae et al. |
| 2015/0055886 A1 | 2/2015 | Oh et al. |
| 2015/0130893 A1* | 5/2015 | Kimura .............. H04N 5/23216 348/36 |

FOREIGN PATENT DOCUMENTS

| | | |
|---|---|---|
| CN | 202541437 U | 11/2012 |
| CN | 102914803 A | 2/2013 |
| CN | 203134149 U | 8/2013 |
| CN | 103929628 A | 7/2014 |
| CN | 104661008 A | 5/2015 |
| CN | 104683767 A | 6/2015 |
| CN | 104822033 A | 8/2015 |
| EP | 1 883 227 A2 | 1/2008 |
| EP | 2 658 245 A1 | 10/2013 |
| EP | 2936799 A1 * | 10/2015 .............. H04N 5/332 |
| WO | 2014/100783 A1 | 6/2014 |
| WO | 2014/100787 A1 | 6/2014 |
| WO | 2015/011824 A1 | 1/2015 |

OTHER PUBLICATIONS

Fourth Office Action for CN Application No. 201510540746.6 dated Jun. 4, 2019, 9 pages.
International Search Report (with English translation), dated Oct. 27, 2016, for PCT/CN2016/093076, 9 pages.

* cited by examiner

IMAGE SIGNAL PROCESSING METHOD AND SYSTEM

The present application claims the priority to a Chinese patent application No. 201510540746.6, filed with the State Intellectual Property Office of People's Republic of China on Aug. 28, 2015 and entitled "Method and system for processing image signals", which is incorporated herein by reference in its entirety.

TECHNICAL FIELD

The present application relates to a field of security, and more particularly to a method and system for processing image signals.

BACKGROUND

In daily life, night is a period for mostly occurring various cases. In the field of security, in an environment of low illumination at night, an image effect of a camera is often the focus of people's attention. At present, switching method of Infrared CUT (IR-CUT) is often used to take into account monitoring image effects of the day and night, its working principle is: in an environment of low illumination that lacks of light at night, the camera switching from a day mode filtering infrared light into a night mode sensing infrared band by switching of IR-CUT, such that the camera can also obtain less noise images in the environment of low illumination. However, the infrared light will affect the camera's perception of color, thus in the night mode, the camera often outputs black and white images, thus lost the color information of the images.

In addition, in recent years haze weather is gradually increased. In the field of security, in order to ensure the image effect, penetrating-haze function is often added to the camera to meet monitoring requirements in haze weather. In principle, a part of light wave with shorter wavelength is vulnerable to haze particles, and the longer wavelength the light wave has, the light wave is more hardly blocked by haze particles. Therefore, the camera optical penetrating-haze is realized by filtering out the part with shorter wavelength through an optical filter and leaving the part with longer wavelength, so as to achieve better penetrating-haze effect. However, the optical penetrating-haze processing filters out most of the color information, similar to the night mode described above, it often only outputs black and white images.

SUMMARY

The object of the present application is to provide a method and system for processing image signals for solving a problem that only a black and white image can be outputted in low illumination environment, haze environment, and low illumination and haze environment in the field of security.

According to one aspect of the present application, a method for processing image signals includes sensing visible light bands of optical signals in an area to be imaged, via a first imaging unit, to generate a first image signal, wherein the first image signal includes color information; sensing at least infrared bands of optical signals in the area to be imaged, via a second imaging unit, to generate a second image signal, wherein the second image signal includes illumination information; and synthesizing the first image signal and the second image signal to generate a synthesized image with color information and illumination information.

According to another aspect of the present application, a system for processing image signals is provided, including a first imaging unit, for sensing visible light bands of optical signals in an area to be imaged to generate a first image signal, wherein the first image signal includes color information; a second imaging unit, for sensing at least infrared bands of optical signals in the area to be imaged to generate a second image signal, wherein the second image signal includes illumination information; and a signal synthesizing unit, for synthesizing the first image signal and the second image signal to generate a synthesized image with color information and illumination information.

The present application also provides an electronic device, including: a housing, a processor, a memory, a circuit board, and a power supply circuit, wherein the circuit board is disposed inside a space enclosed by the housing, the processor and the memory are disposed on the circuit board; the power supply circuit is configured for powering various circuit or device; the memory is configured for storing executable program codes; the processor executes a program corresponding to the executable program code by reading the executable program code stored in the memory for implementing the method for processing image signals provided by the embodiment of the present application the program.

The present application also provides a storage medium for storing executable program code, which implements the method for processing image signals provided by the embodiment of the present application when being executed.

The present application obtains a plurality of photosensitive signals by sensing different bands, to generate a fill light control signal based on the gain of images to control the infrared fill light. Performing infrared fill light, time synchronization and image registration on the plurality of photosensitive signals, and the photosensitive signals after performing infrared fill light, time synchronization and image registration are synthesized to generate a synthesized image. The synthesized image has many advantages. In low illumination environment, it can generate a monitoring image with small noise and rich color, and can meet the monitoring requirements in low illumination environment. In the case of haze, it can generate a monitoring image with rich color and a better penetrating-haze effect, and can meet the monitoring requirements in the haze environment. In the case of low illumination and haze, it can generate a monitoring image with small noise, rich colors and better penetrating-haze effect, and can meet the two monitoring requirements of low illumination and haze which are focused in the field of security.

DETAILED DESCRIPTION

In order to make the purpose, technical solutions and advantages of the present application more clearly, the present application will be described in further detail in combination with specific embodiments and with reference to the accompanying drawings. It should be understood that these descriptions are only exemplary and are not intended to limit the scope of the present application. In addition, in the following description, descriptions of well-known structures and techniques are omitted to avoid unnecessarily confusing the concept of the present application.

It should be noted that: IR-CUT dual filter (also known as dual optical filter switcher) refers to a set of filters built-in in the camera lens group, when infrared sensing points outside the lens detect the changing of the intensity of light, the built-in IR-CUT automatic switching filter can automatically switch according to the intensity of the external light, so that the image could achieve the best effect. That is to say, in the day or night, the dual optical filter can automatically switch the filter, so whether it is day or night, the best imaging effect can be achieved. Specifically, under the day mode, the infrared optical filter is loaded and infrared component is filtered out when sensing; under the night mode, the infrared optical filter is removed and it is sensitive for infrared wave band.

Automatic Gain: a video signal output by the camera must meet a standard level specified by the TV transmission, that is, in order to be able to output the standard video signal in different scene illumination conditions, the gain of an amplifier must be adjusted in a large range. This gain adjustment is usually automatically accomplished by detecting an average level of the video signal. A circuit that implements this function is called Automatic Gain Control (AGC) circuit. The sensitivity of a camera with the AGC function will be improved in low illumination, but noise point will be obvious at this time. This is due to the fact that the signal and noise are amplified at the same time.

Figure 1:
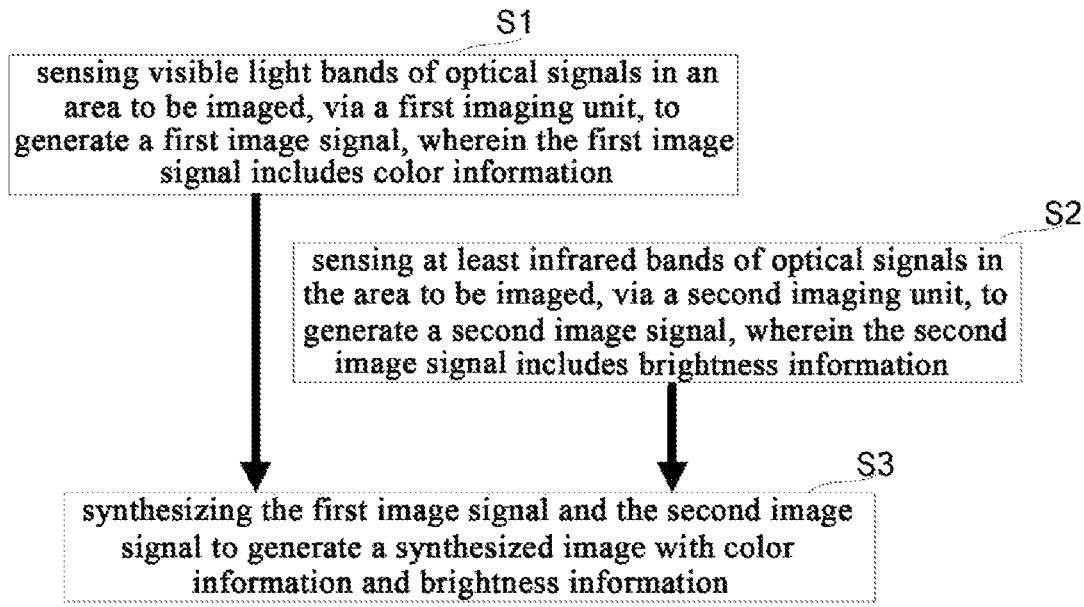
FIG. 1 is a schematic flow chart of the method for processing image signals of the present application.

FIG. 1 is a schematic flow chart of the method for processing image signals of the present application.

As shown in FIG. 1, the method for processing image signals of the present application includes the steps of:

Step S1, sensing visible light bands of optical signals in an area to be imaged, via a first imaging unit, to generate a first image signal, and the first image signal includes color information.

In this step, the image of a monitoring scene is collected by a camera. The camera of the present embodiment has two imaging units: a first imaging unit and a second imaging unit, and two imaging units monitor a monitoring scene of the same area respectively. Sensing visible light bands of optical signals in an area to be imaged, via the first imaging unit, primarily collecting color information in optical signals, to generate the first image signal (an image is present in form of an image signal in a computer), the first image signal includes color information.

Specifically, in step 1, it is necessary to filter out infrared bands of optical signals in an area to be imaged before sensing the visible light bands of the optical signals in an area to be imaged. For example, the infrared bands could be filtered out by the infrared optical filter. After filtering out the infrared bands, sensing the visible light bands of the optical signals in an area to be imaged to generate the first image signal, so that the color information with smaller noise and higher quality can be obtained.

Step S2, sensing at least infrared bands of optical signals in an area to be imaged, via a second imaging unit, to generate a second image signal, and the second image signal includes brightness information.

In this step, in the step of generating the second sensing signal, the step of sensing at least infrared bands of the optical signals in an area to be imaged includes: sensing visible light bands and infrared bands of the optical signals in an area to be imaged to generate a second image signal, and the second image signal includes brightness information. The method also includes: sensing infrared bands of optical signals in an area to be imaged via a third imaging unit, to generate a third image signal, and the third image signal includes brightness information. Specifically, it is necessary to filter out visible light bands of optical signals in an area to be imaged before the third imaging unit sensing infrared bands of the optical signals in an area to be imaged. For example, visible light bands of the optical signals in an area to be imaged can be filtered out via the visible light optical filter, and after filtering out the visible light bands, sensing the infrared bands of the optical signals in an area to be imaged to generate the third image signal.

Specifically, depending on different applicable scenes, the execution of the present step includes three cases: Case 1: on the basis of the first imaging unit, sensing the visible light bands and infrared bands of the optical signals in an area to be imaged, via the second imaging unit, to generate a second image signal, and the second image signal includes brightness information. Case 2: on the basis of the first imaging unit, sensing infrared bands of the optical signals in an area to be imaged, via the third imaging unit, to generate a third image signal, and the third image signal includes brightness information. Case 3 is a combination of case 1 and case 2, that is, on the basis of the first imaging unit, sensing visible light bands and infrared bands of the optical signals in an area to be imaged, via the second imaging unit, to generate a second image signal, and the second image signal includes brightness information, and sensing infrared bands of the optical signals in an area to be imaged, via the third imaging unit, to generate a third image signal, and the third image signal includes brightness information.

Case 1 applies to the processing of image signals in low illumination environment (such as illumination below 0.1 lux), case 2 applies to the processing of image signals in haze environment, and case 3 applies to the processing of image signals in low illumination and haze environment.

Here, the execution order of steps S1 and S2 is not unique and can be executed at the same time or executed one after another.

Step S3, synthesizing the first image signal and the second image signal to generate a synthesized image with color information and brightness information.

Specifically, the color information is obtained from the first image signal in step S1 and the brightness information is obtained from the second image signal in step S2, and the first and second image signals are synthesized to generate a synthesized image with color information and brightness information.

Similarly, depending on different application scenes, the execution of this step also includes three cases: continue the above example, Case 1: synthesizing the first and second image signals in low illumination environments to generate a synthesized image with color information and brightness information. Case 2: synthesizing the first and third image signals in haze environment to generate a synthesized image with color information and penetrating-haze effect. Case 3: synthesizing the first, second and third image signals in low illumination and haze environment to generate a synthesized image with color information, illumination information and penetrating-haze effect.

Figure 2:
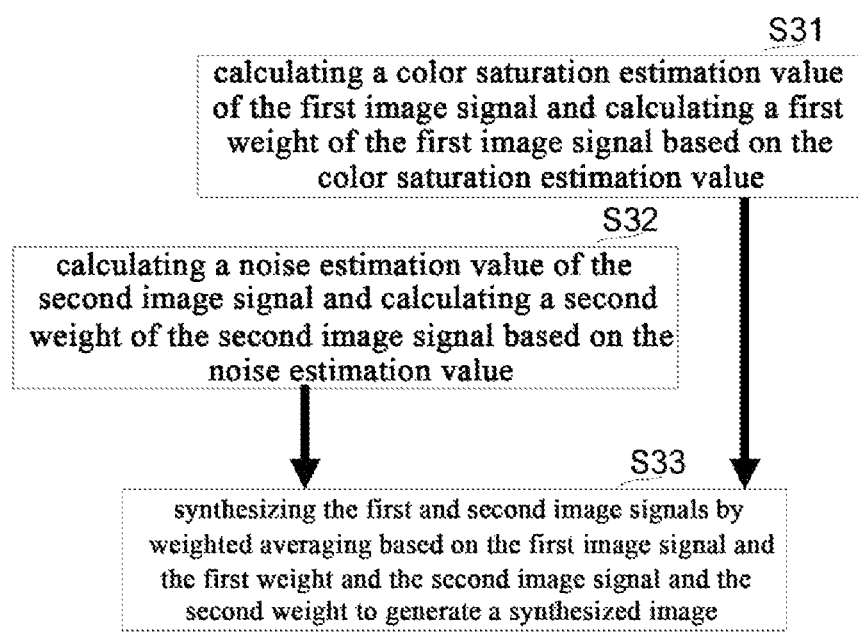
FIG. 2 shows a schematic flow chart of synthesizing image signals in low illumination environment in an embodiment of the present application.

FIG. 2 shows a schematic flow chart of synthesizing image signals in low illumination environment in an embodiment of the present application.

As shown in FIG. 2, in low illumination environment, the aforementioned step S3 of the present application includes the following steps:

Step S31, calculating a color saturation estimation value of the second image signal and calculating a first weight of the first image signal based on this color saturation estimation value.

In this step, the color saturation estimation value sat of the second image signal and the first weight w1 are calculated according to the following formula:

$$\begin{cases} sat = \dfrac{\max(r, g, b) - \min(r, g, b)}{\max(r, g, b)} \\ w1 = 1 - sat \end{cases},$$

wherein, r represents red, g represents green, b represents blue, and the values of r, g, b range between 0 and 255; max represents the maximum value, min represents the minimum value, sat represents the color saturation estimation value of the second image signal, and the value of which ranges between 0 and 1; w1 represents the first weight of the first image signal. The color saturation estimation value indicates the color information of the optical signals in an area to be imaged. Weight refers to the relative importance of an indicator in the overall evaluation.

Step S32, calculating a noise estimation value of the first image signal and calculating a second weight of the second image signal based on this noise estimation value.

In this step, the noise estimation value noise of the first image signal is calculated, and the noise estimation value noise indicates the brightness information of the first image signal. Specifically, firstly obtaining brightness value of the first image signal, and then performing convolution operation on the brightness value to obtain a noise distribution for each pixel position in the first image signal, and performing low-pass filtering processing on the noise distribution to obtain the noise estimation value noise of the first image signal. Specifically, brightness value of the first image signal is calculated firstly (brightness value indicates the brightness information of the first image signal (i.e., the first image). Here, brightness value is a brightness average value obtained after averaging R, G, and B of the first image signal (i.e., the first image)), and then performing convolution operation on the brightness value to obtain a noise distribution of each pixel position in the first image signal; in the present embodiment, the convolution operation refers to traversing each pixel in the image, and for each pixel in the image, the pixel values within a certain range (such as 3×3) around which are taken out and multiplied and accumulated by the convolution kernel (i.e., convolution template) to obtain a noise distribution of each pixel position in the current image. For example, for a certain pixel in the first image signal (i.e., the first image), nine pixel values v1 to v9, i.e., 3×3, of whose periphery are taken out and multiplied and accumulated by nine coefficients a1 to a9 of the convolution kernel (i.e., convolution template), v=v1*a1+ v2*a2+ . . . +v9*a9, the result of the operation is treated as a new value of the current pixel. Similarly, traversing all the pixels in the first image signal (i.e., the first image) and doing the similar processing, and finally, a noise distribution of the pixel position in the first image signal (i.e., the first image) is obtained. For example, the following convolution kernel (i.e., convolution template) may be employed to perform the convolution operation to obtain the noise distribution of each pixel position:

$$\begin{bmatrix} 1 & -2 & 1 \\ -2 & 4 & -2 \\ 1 & -2 & 1 \end{bmatrix}$$

In the embodiment of the present application, a general formula is: img_out=img_in*kernel; wherein, img_in is a matrix of an input image, img_out is a matrix of a output image, kernel is the convolution kernel, and * represents the convolution operation. The noise distribution is then subjected to a filtering processing, for example, performing low-pass filtering processing to obtain a noise estimation value of the first image signal. Similar to the convolution operation described above, the following template may be employed to perform convolution operation to obtain a noise estimation value, which would not be described any more.

$$\begin{bmatrix} 1 & 1 & 1 \\ 1 & 2 & 1 \\ 1 & 1 & 1 \end{bmatrix}$$

It should be noted that: Low-pass filter is a filtering manner, which allows low-frequency signals pass normally, while high-frequency signals beyond a set threshold value are blocked and weakened.

The second weight w2 of the second image signal is calculated according to the following formula:

$$w2 = \dfrac{\min(\operatorname{abs}(noise), thr_1)}{thr_1},$$

wherein w2 represents the second weight of the second image signal, noise represents the noise estimation value of the first image signal, abs(noise) represents the absolute value of the noise estimation value, min(abs(noise),$thr_1$) represents taking the minimum value of abs(noise) and $thr_1$, $thr_1$ represents an empirical constant for calculating the second weight w2, which ranges between 0 and 255, this empirical constant can be calculated by empirical formula. In one embodiment of the present application, $thr_1$ is taken as 80.

Here, the execution order of steps S31 and S32 is not unique and can be executed at the same time or executed one after another.

Step S33, synthesizing the first and second image signals by weighted averaging based on the first image signal and the first weight and the second image signal and the second weight to generate a synthesized image.

In this step, the first and second image signals are synthesized according to the following formula to generate a synthesized image:

$$img=(img_1*w1+img_2*w2)/(w1+w2),$$

$img_1$, $img_2$ represents the first image signal and the second image signal respectively, img represents the generated synthesized image.

For areas with smaller color saturation, the weight of the first image signal is higher. For areas with larger noise, the weight of the second image signal is higher. In low illumination environment, the image synthesized by the above method has the advantages of low noise and rich color, and can meet the monitoring requirements in low illumination environment.

Optionally, the user can set the weight and output the corresponding image signal based on the set weight. For example, the weight w1 can be specified as 0, and the weight w2 can be specified as 1, and the second image signal is outputted at this time; or the weight w1 can be specified as 1, and the weight w2 can be specified as 0, and the first image signal is outputted at this time.

Figure 3:
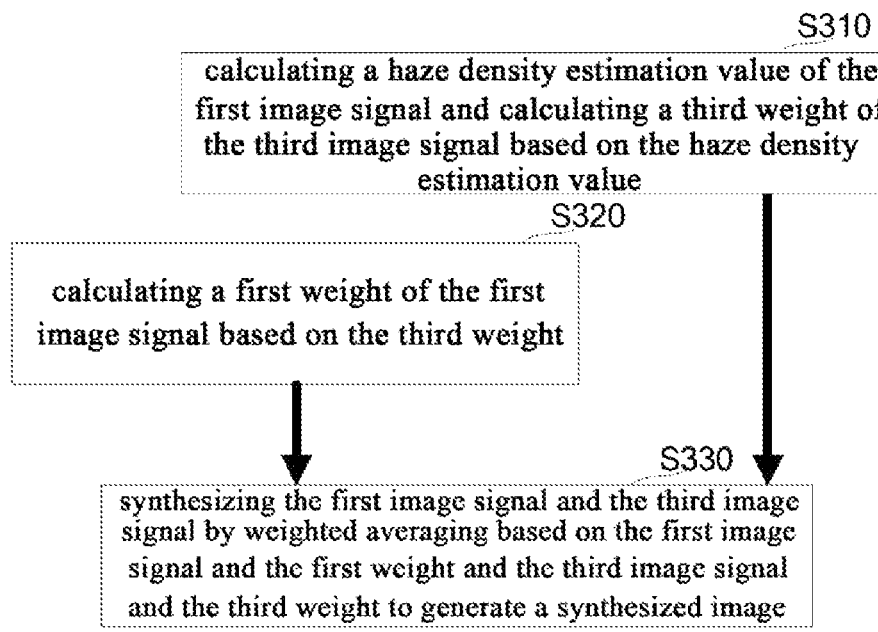
FIG. 3 shows a schematic flow chart of synthesizing image signals in haze environment in another embodiment of the present application.

FIG. 3 shows a schematic flow chart of synthesizing image signals in haze environment in another embodiment of the present application.

As shown in FIG. 3, in haze environment, the aforementioned step S3 of the present application includes the following steps:

Step S310, calculating a haze density estimation value of the first image signal and calculating a third weight of the third image signal based on this haze density estimation value.

In this step, the haze density estimation value of the first image signal is calculated. The haze density estimation value can be calculated using the calculation method in the prior art, for example, a method of local mean filtering can be used to calculate the haze density estimation value ds.

The third weight of the third image signal is calculated according to the following formula:

$$w3 = \frac{\min(abs(ds), thr_2)}{thr_2},$$

wherein w3 represents the weight of the third image signal, ds represents the haze density estimation value of the first image signal, abs(ds) represents the absolute value of the haze density estimation value, $\min(abs(ds),thr_2)$ represents taking the minimum value of abs(ds) $thr_2$, $thr_2$ and represents an empirical constant for calculating the third weight w3, which range between 0 and 255, this empirical constant can be calculated by empirical formula. In one embodiment of the present application, $thr_2$ is taken as 128.

Step S320, a first weight of the first image signal is calculated based on the third weight.

In this step, the first weight of the first image signal is calculated according to the following formula:

$$w1=1-w3$$

Step S330, synthesizing the first and third image signals by weighted averaging based on the first image signal and the first weight and the third image signal and the third weight to generate a synthesized image.

In this step, the first and third image signals are synthesized according to the following formula to generate a synthesized image:

$$img=(img_1*w1+img_3*w3)/(w1+w3),$$

$img_1$, $img_3$ represents the first image signal and the third image signal respectively, img represents the generated synthesized image.

Similarly, for areas with smaller color saturation, the weight of the first image signal is higher. For areas with stronger haze, the weight of the third image signal is higher. In haze environment, the image synthesized by the above method has the advantages of rich color and penetrating-haze, and can meet the monitoring requirements in haze environment.

Similarly, optionally, the user can set the weight and output the corresponding image signal based on the set weight. For example, the weight w1 can be specified as 0, and the weight w3 can be specified as 1, and the third image signal is outputted at this time; or the weight w1 can be specified as 1, and the weight w3 can be specified as 0, and the first image signal is outputted at this time.

Figure 4:
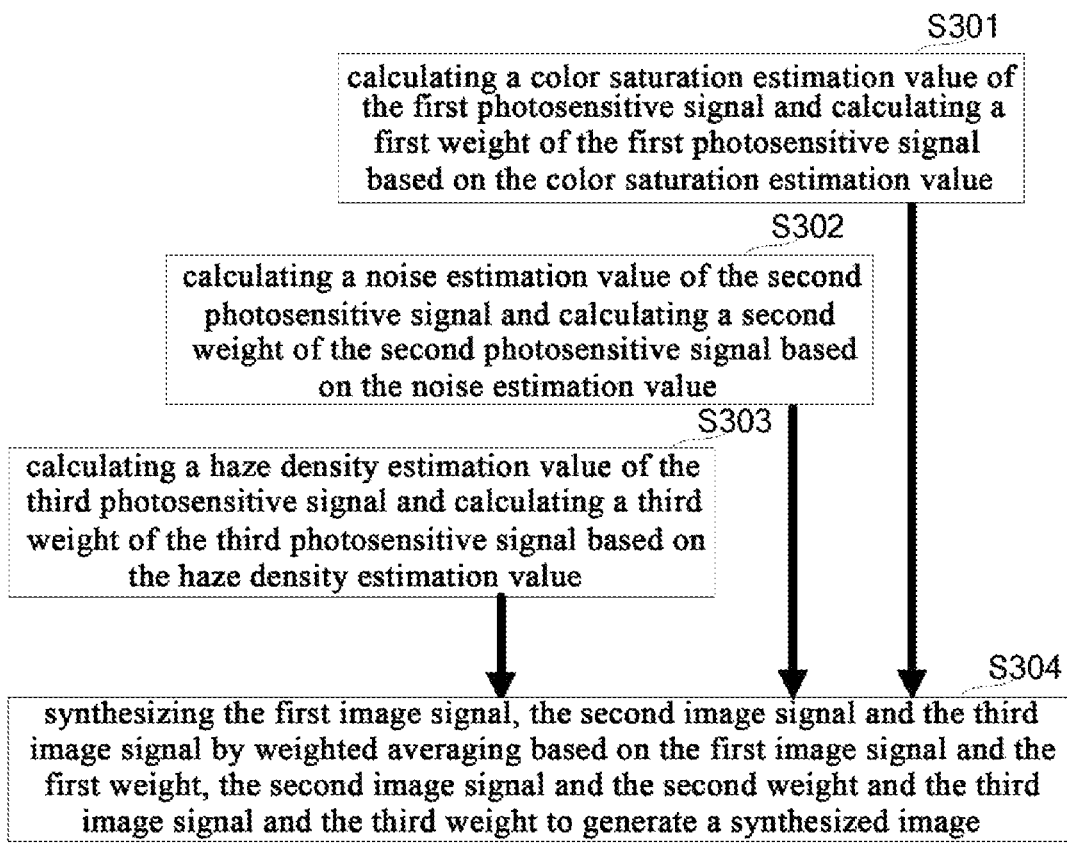
FIG. 4 shows a schematic flow chart of synthesizing image signals in low illumination and haze environment in another embodiment of the present application.

FIG. 4 shows a schematic flow chart of synthesizing image signals in low illumination and haze environment in another embodiment of the present application.

As shown in FIG. 4, in low illumination and haze environment, the aforementioned step S3 of the present application includes the following steps:

Step S301, calculating a color saturation estimation value of the second image signal and calculating a first weight of the first image signal based on this color saturation estimation value.

Specific execution flow could refer to step S31 and would not be described here any more.

Step S302, calculating a noise estimation value of the first image signal and calculating a second weight of the second image signal based on this noise estimation value.

Specific execution flow could refer to step S32 and would not be described here any more.

Step S303, calculating a haze density estimation value of the first image signal and calculating a third weight of the third image signal based on this haze density estimation value.

Specific execution flow could refer to step S310 and would not be described here any more.

Here, the execution order of steps S301, S302 and S303 is not unique and can be executed at the same time or executed one after another.

Step S304, synthesizing the first, second and third image signals by weighted averaging based on the first image signal and the first weight, the second image signal and the second weight, and the third image signal and the third weight to generate a synthesized image.

In this step, the first, second and third image signals are synthesized according to the following formula to generate a synthesized image:

$$img=(img_1*w1+img_2*w2+img_3*w3)/(w1+w2+w3),$$

$img_1$, $img_2$, $img_3$ represents the first image signal, the second image signal and the third image signal respectively, img represents the generated synthesized image.

Similarly, for areas with smaller color saturation, the weight of the first image signal is higher. For areas with larger noise, the weight of the second image signal is higher. For areas with stronger haze, the weight of the third image signal is higher. In low illumination and haze environment, the image synthesized by the above method has the advantages of low noise, rich color and penetrating-haze, and can meet the monitoring requirements in low illumination and haze environment.

Similarly, optionally, the user can set the weight and output the corresponding image signal based on the set weight size. For example, the weights w1, w2 can be specified as 0, and the weight w3 can be specified as 1, and the third image signal is outputted at this time. Alternatively, the weight w2 can be specified as 1, and the weights w1, w3 can be specified as 0, and the second image signal is outputted at this time. w1 can be specified as 1, and the weights w2, w3 can be specified as 0, and the first image signal is outputted at this time. In an optional embodiment, after the step of generating the image signal, further including a step of outputting the first image signal, the second image signal, or the third image signal outwardly. Specifically, the first image signal, the second image signal, or the third image signal can be outputted based on the weight set by the user or based on the weight calculated above.

Figure 5:
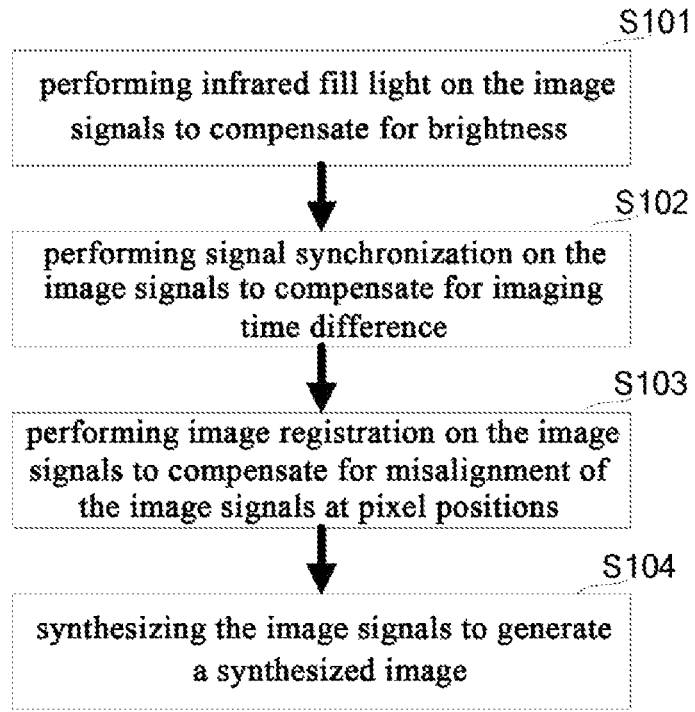
FIG. 5 shows a schematic flow chart of synthesizing image signals in an optional embodiment of the present application.

FIG. 5 shows a schematic flow chart of synthesizing image signals in an optional embodiment of the present application.

As shown in FIG. 5, in an optional embodiment, the step of synthesizing the images includes:

Step S101, performing infrared fill light on the image signals to compensate for brightness.

In this step, optionally, performing infrared fill light on one or more image signals to compensate for brightness before synthesizing the image signals.

Step S102, performing signal synchronization on the image signals to compensate for imaging time difference.

In this step, optionally, performing signal synchronization on a plurality of image signals to compensate for imaging time difference before synthesizing the image signals. When collecting images, there is imaging time difference between the collected images due to collecting images with different cameras or image collecting devices. In present application, the imaging time difference can be approximated as a constant value. In the case where the imaging time difference is a constant value, the signal synchronization can be performed by caching the predetermined numbers of frames.

Similarly, depending on different using scenes, this step also includes three cases, case 1: performing signal synchronization on the first and second image signals in low illumination environment. Case 2: performing signal synchronization on the first and third image signals in haze environment. Case 3: performing signal synchronization on each two of the first, the second and the third image signals in low illumination and haze environment.

Step S103, performing image registration on the image signals to compensate for misalignment of the image signals at pixel positions.

In this step, optionally, performing image registration on a plurality of image signals to compensate for misalignment of the image signals at pixel positions before synthesizing the image signals. It should be noted that since spatial relative positions of optical signals in a plurality of areas to be imaged are fixed, geometrical mapping relationship generated between a plurality of image signals is also fixed, so that a plurality of cameras or image collecting devices can be used firstly to shoot a given image, and then calculate mapping relationship between a plurality of images, that is, transformation matrix. Subsequently, this transformation matrix can be directly configured for synthesizing a plurality of image signals, so that the plurality of image signals can achieve image registration and the transformation matrix itself is fixed.

Similarly, depending on different application scenes, this step also includes three cases, case 1: performing image registration on the first and second image signals in low illumination environment; case 2: performing image registration on the first and third image signals in haze environment; case 3: performing image registration on each two of the first, the second and the third image signals in low illumination and haze environment.

Here, the execution order of steps S101, S102 and S103 is not unique and can be executed at the same time or executed one after another.

Step S104, synthesizing the image signals to generate a synthesized image.

Depending on different application scenes, the execution of this step also includes three cases, case 1: synthesizing the first and second image signals in low illumination environment; case 2: synthesizing the first and third image signals in haze environment; case 3: synthesizing each two of the first, the second and the third image signals in low illumination and haze environment.

Figure 6:
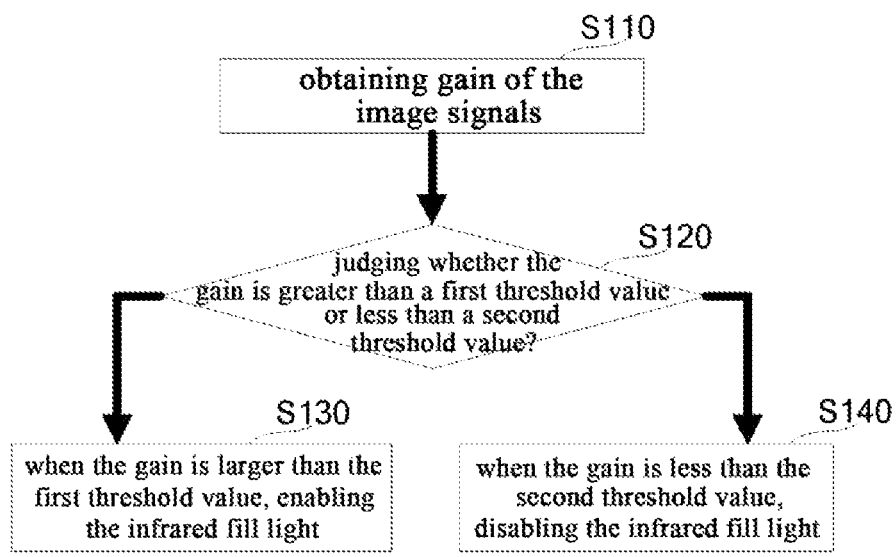
FIG. 6 shows a schematic flow chart of performing infrared fill light in an optional embodiment of the present application.

FIG. 6 shows a schematic flow chart of performing infrared fill light in an optional embodiment of the present application.

As shown in FIG. 6, in an optional embodiment, the step of performing infrared fill light includes the steps of:

Step S110, obtaining gain of the image signal.

The gain information of the image signal is obtained. Here, the gain information indicates the noise level of the image signals, and the larger the gain, the greater the noise ratio of the image signals, performing infrared fill light when the outside light is considered as insufficient; otherwise on the contrary. It should be noted that the gain refers to magnification of the image collecting devices (such as cameras) at the time of collecting image signals, which is similar to the ISO value in the digital cameras. The higher the ISO value, the stronger the sensing capability of the sensing elements.

Step S120, judging whether the gain is greater a the first threshold value T1 or less than a second threshold value T2.

Specifically, judging whether the obtained gain is greater than the first threshold value T1 or whether the gain is less than the second threshold value T2, and the infrared fill light control is performed based on the judgment result, wherein the first threshold value T1 is larger than the second threshold value T2.

Step S130, when the gain is larger than the first threshold value, enabling the infrared fill light.

Step S140, when the gain is less than the second threshold value, disabling the infrared fill light.

Specifically, when the judgment result of the step S120 is larger than the first threshold value T1, enabling the infrared fill light, and performing infrared fill light on the first image signal, the second image signal, or the third image signal to enhance the overall brightness of the images. When the judgment result of the step S120 is less than the second threshold value T2, disabling the infrared fill light.

In the present application, the purpose of performing infrared fill light is to enhance scene brightness of the image (i.e., the overall brightness of the image), reduce noise, and thereby improving recognition of a target in the scene. In the above step S2, sensing at least the infrared bands of the image signal to generate a second image signal, wherein the second image signal includes brightness information, where the brightness information mainly indicates the relative brightness of the image (i.e., the degree of brightness of the image).

Figure 7:
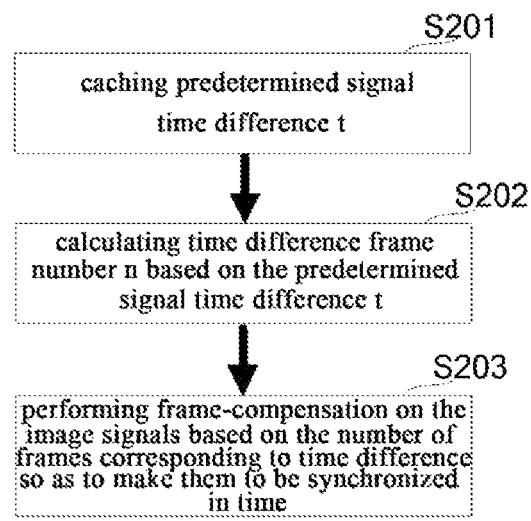
FIG. 7 shows a schematic flow chart of signal synchronization in another optional embodiment of the present application.

FIG. 7 shows a schematic flow chart of signal synchronization in an optional embodiment of the present application.

As shown in FIG. 7, in an optional embodiment, the step of performing signal synchronization on the image signals includes the following steps:

Step S201, caching predetermined signal time difference t.

In the present application, the signal time difference t between the two image signals can be approximated as being constant, and thus can be pre-cached and called directly upon subsequent processing.

Step S202, calculating the number of frames n corresponding to time difference based on the predetermined signal time difference t.

In case the frame frequency fps is determined, the signal time difference t between the two image signals can be converted into the corresponding number of frames, that is, the difference of the number of frames between the two image signals, the formula is as follows:

$$n = f(t/fps), n \geq 1$$

wherein, t represents preset signal time difference t, fps represents the frame frequency, which represents the number of frames n corresponding to time difference which corresponds to the signal time difference t. Wherein n=f(t/fps) represents calculating approximate number of quotient of t and fps by rounding-off method.

Step S203, performing frame-compensation on the image signals based on the number of frames corresponding to time difference so as to make them to be synchronized in time.

In this step, performing frame-compensation on the two-way image signals based on the determined number of frames n corresponding to time difference. For example, n frames are compensated for the earlier image signal so that it is synchronized with the other image signal in time.

In the embodiment of the present application, the purpose of the signal synchronization is to compensate for the imaging time difference of different image signals such that the imaging time of the first image signal and the second image signal, of the first image signal and the third image signal and of the first image signal, the second image signal and the third image signal can correspond to each other to optimize the quality of the synthesized image.

Figure 8:
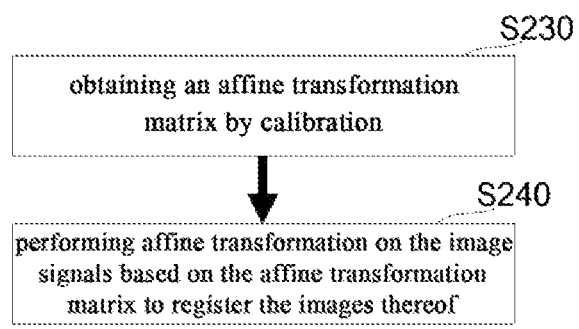
FIG. 8 shows a schematic flow chart of image registration in an optional embodiment of the present application.

FIG. 8 shows a schematic flow chart of image registration in an optional embodiment of the present application.

In this step, performing affine transformation the image signals based on an affine transformation matrix to compensate for misalignment of the image signals at the pixel positions.

As shown in FIG. 8, in an optional embodiment, the step of performing image registration on the image signals includes the following steps:

Step S230, obtaining an affine transformation matrix by calibration.

In this step, the affine transformation matrix is obtained by pre-calibration.

Step S240, performing affine transformation on the image signals based on the affine transformation matrix to register the images thereof.

In this step, performing affine transformation on one of the signals based on the determined affine transformation matrix to achieve signal registration.

For multi-way signal registration, it can be implemented by decomposed into multiple two-way registration.

In the present application, the purpose of the image registration is to compensate for the misalignment of different image signals at the pixel positions, such that the first image signal and the second image signal, the first image signal and the third image signal, and the first image signal, the second image signal and the third image signal can correspond to each other at each pixel position to optimize the quality of the synthesized image.

In an optional embodiment, it includes the step of preprocessing the first image signal, the second image signal, and/or the third image signal before the step of synthesizing the images, to optimize the synthesizing quality of the synthesized image.

The preprocessing includes but not limited to the automatic exposure, white balance, color correction, noise reduction, gamma correction, and contrast or the like. Specifically, optionally, the first image signal is subjected to automatic exposure, white balance and/or noise reduction processing; the second image signal is subjected to automatic exposure, white balance and/or color correction processing; the third image signal is subjected to automatic exposure, white balance and/or contrast processing. Preferably, the first image signal is subjected to automatic exposure, white balance and noise reduction processing; the second image signal is subjected to automatic exposure, white balance and color correction processing; the third image signal is subjected to automatic exposure, white balance and contrast processing.

It should be noted that: automatic exposure means that a camera automatically adjust the exposure according to the strength of the light to prevent excessive or insufficient exposure. For example, the image signals can be processed by automatic exposure through controlling a shutter based on the gain information of the images, so that the first image signal, the second image signal, or the third image signal conforms to a certain brightness requirement. For example, the brightness threshold value can be set in advance, and when brightness of the first image signal, the second image signal, or the third image signal exceeds the brightness threshold value, the first image signal, the second image signal, or the third image signal is considered to be acceptable. The purpose of the white balance processing is to make the plurality of image signals have the same tone standard. The purpose of the noise reduction processing is to make the first image signal have a higher signal to noise ratio. The purpose of the color correction processing is to make the second image signal have a more accurate color effect. The purpose of the contrast processing is to enhance the penetrating-haze effect of the third image signal, that is, increasing image transparency, and the penetrating-haze effect of the image can be enhanced by enhancing the contrast.

Preferably, the first image signal, the second image signal, and the third image signal are subjected to the above preprocessing before synthesizing the image signals, and then to infrared fill light, time synchronization, and image registration to enhance the synthesizing quality of the synthesized image.

As described above, the method for processing image signals of the embodiment of the present invention is described in detail, and the monitoring requirements in low illumination environment, haze environment and low illumination and haze environment can be meet by obtaining color information and brightness information from the image signals and combining the color information and the brightness information to generate a synthesized image having a plurality of advantages.

Figure 9:
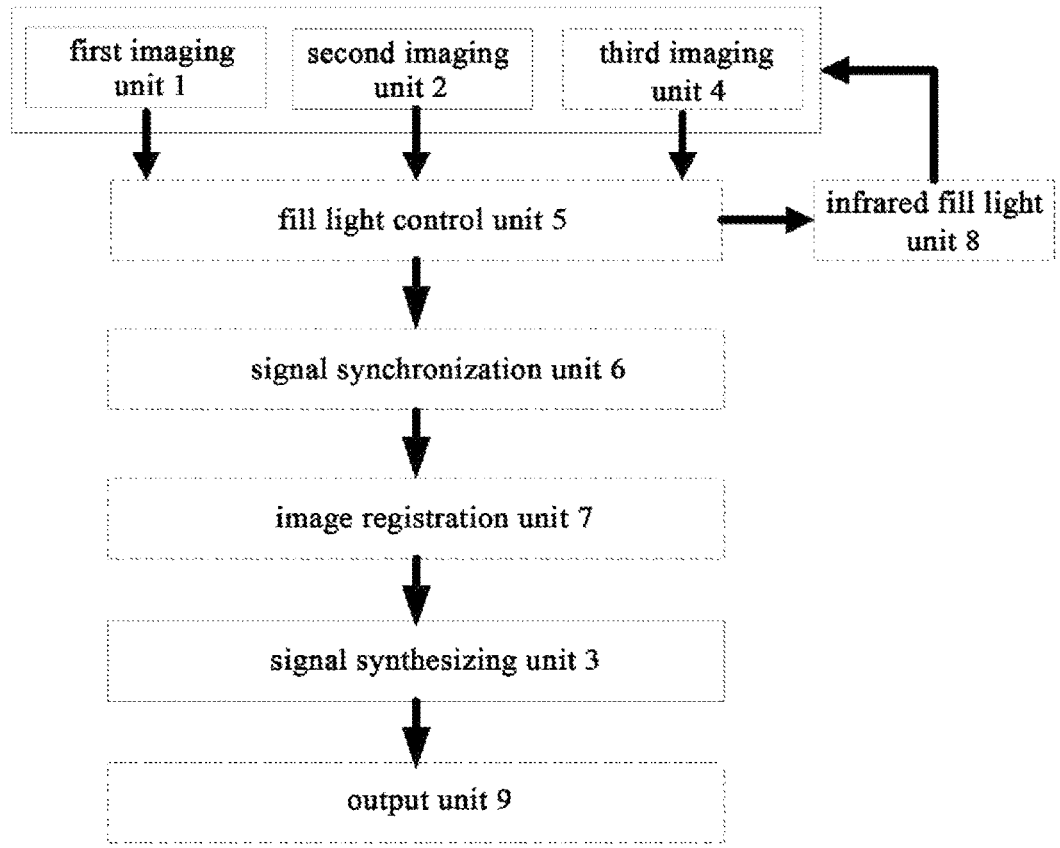
FIG. 9 is a schematic structural view of the system for processing image signals of the present invention.

FIG. 9 is a schematic structural view of the system for processing image signals of an embodiment of the present invention.

As shown in FIG. 9, the system for processing image signals of the embodiment of the present application includes a first imaging unit 1, a second imaging unit 2, and a signal synthesizing unit 3. Optionally, a third imaging unit 4 is also included.

The first imaging unit 1 is configured for sensing visible light bands of optical signals in an area to be imaged to generate a first image signal, and the first image signal includes color information. Specifically, the first imaging unit 1 senses visible light bands of optical signals in an area to be imaged to generate a first image signal (an image presents in the form of an image signal in an computer), the first image signal includes color information. The generated first image signal is sent to the signal synthesizing unit 3 for synthesizing. The first imaging unit 1 includes an infrared filtering unit for performing infrared filtering on the optical signals in the area to be imaged to filter out the infrared bands before sensing the visible light bands of the optical signals in the area to be imaged.

The second imaging unit 2 is configured for sensing at least infrared bands of optical signals in the area to be imaged to generate a second image signal, and the second image signal includes brightness information. Specifically, in low illumination environment, sensing visible light bands and infrared bands of optical signals in the area to be imaged, via the second imaging unit, to generate the second image signal, and the second image signal includes brightness information.

The signal synthesizing unit 3 is connected to the first imaging unit 1 and the second imaging unit 2, and is configured for synthesizing the first image signal and the second image signal to generate a synthesized image with color information and brightness information. Specifically, in low illumination environment, the signal synthesizing unit 3 synthesizes the first image signal and the second image signal to generate a synthesized image with color information and brightness information.

In an optional embodiment, the system further includes: a third imaging unit 4. The third imaging unit 4 is configured for sensing infrared bands of optical signals in the area to be imaged, to generate a third image signal, and the third image signal includes brightness information. The generated third image signal is sent to the signal synthesizing unit 3 for synthesizing. The third imaging unit 4 includes an visible light filtering unit for filtering the optical signals in the area to be imaged to filter out the visible light bands before sensing the infrared bands of the optical signals in the area to be imaged. Specifically, in haze environment, the signal synthesizing unit 3 synthesizes the first image signal and the third image signal to generate a synthesized image with color information and penetrating-haze effect. However in the low illumination and haze environment, the signal synthesizing unit 3 synthesizes the first image signal, the second image signal and the third image signal to generate a synthesized image with color information, illumination information and penetrating-haze effect.

Specifically, depending on different using scenes, there are three schemes: Scheme 1: in low illumination environment (e.g., illumination less than 0.1 lux), the system includes a first imaging unit 1, a second imaging unit 2 and a signal synthesizing unit 3; and the second imaging unit 2 senses visible light bands and infrared bands of the optical signals in the area to be imaged to generate a second image signal in low illumination environment. Scheme 2: in haze environment, the system includes a first imaging unit 1, a third imaging unit 4 and a signal synthesizing unit 3. In haze environment, the third imaging unit 4 senses infrared bands of the optical signals in the area to be imaged to generate a third image signal. Scheme 3: in low illumination and haze environment, the system includes a first imaging unit 1, a second imaging unit 2, a third imaging unit 4 and a signal synthesizing unit 3. In low illumination and haze environment, the second imaging unit 2 senses visible light bands and infrared bands of the optical signals in the area to be imaged to generate a second image signal; and the third imaging unit 4 senses infrared bands of the optical signals in the area to be imaged to generate a third image signal.

In the present application, the first imaging unit, the second imaging unit, and the third imaging unit can be image sensors, but the present application is not limited thereto, and can be other types of image capturing/collecting devices.

Preferably, a plurality of imaging units (e.g., a first imaging unit, a second imaging unit, a third imaging unit to a N-th imaging unit) can be set for sensing different bands (e.g., visible light bands, infrared bands, ultraviolet bands, etc.) at the same time. In practical application, a plurality of imaging units can be set for sensing different bands at the same time. In the present application, the infrared bands can be filtered out by adding an infrared optical filter to the image sensor, and the visible light bands can be filtered out by adding a visible light optical filter to the image sensor.

As shown in FIG. 9, in an optional embodiment, the system further includes: a fill light control unit 5, a signal synchronization unit 6, and/or an image registration unit 7.

The fill light control unit 5 is connected to each of the imaging units for generating a fill light control signal to control the infrared fill light to the image signals to compensate for the brightness when the brightness of the image signals is lower than a predetermined threshold value. Specifically, the fill light control unit 5 obtains gain of the image signals to judge whether the gain is larger than the first threshold value T1 or less than the second threshold value T2, wherein when the gain is larger than the first threshold value, a fill light control signal that enables the infrared fill light is sent out; and when the gain is less than the second threshold value, a fill light control signal that disables the infrared fill light is sent out.

The signal synchronization unit 6 is connected to the fill light control unit 5 for performing time synchronization on the image signals to compensate for the imaging time difference.

Specifically, the signal synchronization unit 6 performs time synchronization on the image signals by the following operations:

caching predetermined signal time difference t;

calculating time difference frame number n based on the predetermined signal time difference t, n=f(t/fps), n≥1;

performing frame-compensation on the image signals based on the time difference frame number so as to make them to be synchronized in time.

Specifically, in the present application, the signal time difference between the two-way image signals can be approximated as being constant, and thus can be pre-cached and called directly upon subsequent processing. In a case where the frame frequency fps is determined, the signal time difference t between the two-way image signals can be converted into a corresponding frame number, that is, the difference of the number of frames between the two-way image signals, the formula is as follows:

$$n=f(t/fps), n \geq 1;$$

wherein, t represents preset signal time difference t, fps represents frame frequency, and which represents time difference frame number n corresponding to the signal time difference t. Wherein n=f(t/fps) represents calculating approximate number of quotient of t and fps by rounding-off method. In this step, the two-way image signals are subjected to frame-compensation based on the determined time difference frame number n. For example, n frames are compensated for the earlier image signal so that it is synchronized with the other image signal in time.

The image registration unit 7 is connected to the signal synchronization unit 6 and the signal synthesizing unit 3 for performing image registration on the image signals to compensate for misalignment of the image signals at pixel positions.

Specifically, the image registration unit 6 obtains an affine transformation matrix by pre-calibration, and performs affine transformation on the image signals based on the affine transformation matrix to register the images.

In a preferable embodiment, the system includes the fill light control unit 5, the signal synchronization unit 6 and the image registration unit 7.

As shown in FIG. 9, in an optional embodiment, the system further includes: an infrared fill light unit 8 and an output unit 9.

The infrared fill light unit 8 is connected to the fill light control unit 5 for performing infrared fill light on the image signals based on the received fill light control signal to compensate for brightness.

Specifically, when the gain is larger than the first threshold value T1, the fill light control unit 5 sends out a fill light control signal that enables the infrared fill light, and the infrared fill light unit 8 performs infrared fill light on the image signals based on the received fill light control signal that enables the infrared fill light to compensate for the brightness; when the gain is less than the second threshold value T2, the fill light control unit 5 sends out a fill light control signal that disables the infrared fill light, and the infrared fill light unit 8 stops performing infrared fill light on the image signals based on the received fill light control signal that disables the infrared fill light.

In the present application, the purpose of performing infrared fill light is to enhance scene brightness (i.e., the overall brightness of the images) of the images, so as to enhance the signal strength obtained by sensing at least the infrared bands of the image signals, thereby reducing the noise and improving the recognition of a target in the scene. In the above step S2, at least the infrared bands of the image signal is sensed to obtain brightness information, where the brightness information indicates the relative brightness of the image (i.e., the light and shade part of the image).

The output unit 9 is connected to the signal synthesizing unit 3 for outputting the image signals generated by the signal synthesizing unit 3.

In another optional embodiment, the output unit 9 can be provided to be connected to the various imaging units respectively, so as to directly output the image signals generated by the various imaging units.

Figure 10:
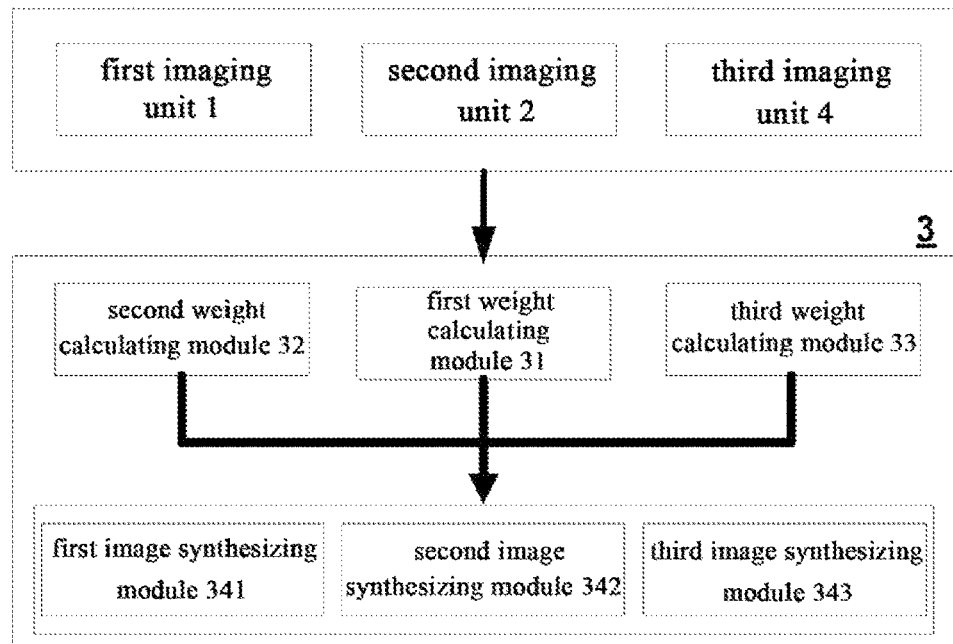
FIG. 10 is a schematic structural view of a signal synthesizing unit of the present application.

FIG. 10 is a schematic structural view of a signal synthesizing unit of the present application.

As shown in FIG. 10, the signal synthesizing unit 3 includes a first weight calculating module 31, a second weight calculating module 32, a third weight calculating module 33, a first image synthesizing module 341, a second image synthesizing module 342 and a third image synthesizing module 343.

The first weight calculating module 31 is connected to the second imaging unit 2, for calculating a color saturation estimation value of the second image signal and calculating a first weight of the first image signal based on this color saturation estimation value.

The first weight calculating module 31 calculates the color saturation estimate value of the second image signal and the first weight according to the following formula:

$$\begin{cases} sat = \dfrac{\max(r, g, b) - \min(r, g, b)}{\max(r, g, b)} \\ w1 = 1 - sat \end{cases},$$

wherein, r represents red, g represents green, b represents blue, and value of r, g, b range between 0 and 255; max represents the maximum value, min represents the minimum value, sat represents the color saturation estimation value of the second image signal, and value of which ranges between 0 and 1; w1 represents the first weight of the first image signal, wherein the color saturation estimation value sat indicates the color information of the image.

The second weight calculating module 32 is connected to the first imaging unit 1, for calculating a noise estimation value of the first image signal and calculating a second weight of the second image signal based on this noise estimation value.

Specifically, the method for calculating the noise estimation value of the first image signal is shown in FIG. 2.

The second weight calculating module 32 calculates the second weight of the second image signal according to the following formula:

$$w2 = \dfrac{\min(\mathrm{abs(noise)}, thr_1)}{thr_1},$$

wherein w2 represents the second weight of the second image signal, noise represents the noise estimation value of the first image signal, abs(noise) represents the absolute value of the noise estimation value, min(abs(noise),$thr_1$) represents taking the minimum value of abs(noise) and $thr_1$, $thr_1$ this represents calculating an empirical constant of the second weight w2, the value of which ranges between 0 and 255, this empirical constant can be calculated by empirical formula. In one embodiment of the present application, $thr_1$ is taken as 80. Wherein the noise estimation value noise indicates the brightness information of the image in low illumination environment.

The third weight calculating module 33 is connected to the first imaging unit 1, for calculating a haze density estimation value of the first image signal and calculating a third weight of the third image signal based on this haze density estimation value.

Specifically, the haze density estimation value of the first image signal is calculated. The density estimation value can be calculated using the calculating method in the prior art, for example, a method of local mean filtering can be used to calculate the haze density estimation value ds, wherein the haze density estimation value ds indicates the brightness information of the image in haze environment.

The third weight calculating module 33 calculates the third weight of the third image signal according to the following formula:

$$w3 = \frac{\min(\text{abs}(ds), thr_2)}{thr_2},$$

wherein w3 represents the weight of the third image signal, ds represents the haze density estimation value of the first image signal, abs(ds) represents the absolute value of the haze density estimation value, $\min(\text{abs}(ds), thr_2)$ represents taking the minimum value of abs(ds) and $thr_2$, $thr_2$ represents an empirical constant for calculating the third weight w3, the value of which ranges between 0 and 255, this empirical constant can be calculated by empirical formula. In one embodiment of the present application, $thr_2$ is taken as 128.

The first image synthesizing module 341, which is connected to the first weight calculating module 31 and the second weight calculating module 32, and synthesizes the first image signal and the second image signal by weighted averaging based on the first image signal and the first weight and the second image signal and the second weight, to generate a synthesized image. Specifically, in low illumination environment, the first image synthesizing module 341 synthesizes the first and the second image signals to generate a synthesized image img according to the following formula:

$$\text{img}=(\text{img}_1*w1+\text{img}_2*w2)/(w1+w2),$$

$\text{img}_1$, $\text{img}_2$ represents the first image signal and the second image signal respectively, w1, w2 represents the first weight and the second weight respectively, img represents the generated synthesized image.

The second image synthesizing module 342, which is connected to the third weight calculating module 33, and determines the first weight of the first image signal based on the third weight, and synthesizes the first, third image signals by weighted averaging to generate a synthesized image based on the first image signal and the determined first weight and the third image signal and the third weight. Specifically, in haze environment, the second image synthesizing module 341 synthesizes the first and the third image signals to generate a synthesized image img according to the following formula:

$$\text{img}=(\text{img}_1*w1+\text{img}_3*w3)/(w1+w3),$$

$$w1=1-w3$$

$\text{img}_1$, $\text{img}_3$ represent the first image signal and the third image signal respectively, w1, w3 represents the first weight and the third weight respectively, img represents the generated synthesized image.

The third image synthesizing module 343, which is connected to the first weight calculating module 31, the second weight calculating module 32 and the third weight calculating module 33, and synthesizes the first image signal, the second image signal and the third image signal by weighted averaging based on the first image signal and the first weight, the second image signal and the second weight and the third image signal and the third weight, to generate a synthesized image. Specifically, in low illumination and haze environment, the third image synthesizing module 343 synthesizes the first, the second and the third image signals to generate a synthesized image img according to the following formula:

$$\text{img}=(\text{img}_1*w1+\text{img}_2*w2+\text{img}_3*w3)/(w1+w2+w3),$$

$\text{img}_1$, $\text{img}_2$, $\text{img}_3$ represent the first image signal, the second image signal and the third image signal respectively, w1, w2, w3 represent the first weight, the second weight and the third weight respectively, img represents the generated synthesized image.

In an optional embodiment, the system further includes an automatic exposure unit, a white balance unit, a noise reduction unit, a color correction unit, and a contrast processing unit.

The automatic exposure unit is configured for performing automatic exposure processing on the first image signal, the second image signal, and the third image signal. For example, the photosensitive signals can be processed by automatic exposure through controlling a shutter based on gain feature of the images, so that the first image signal, the second image signal and the third image signal conform to a certain brightness requirement.

The white balance unit is configured for performing white balance processing on the first image signal, the second image signal, and the third image signal. Specifically, the first image signal, the second image signal and the third image signal could have the same tone standard by the white balance processing.

The noise reduction unit is configured for performing noise reduction processing on the first image signal. Specifically, the purpose of performing noise reduction processing on the first image signal is to make the first image signal have a higher signal to noise ratio.

The color correction unit is configured for performing color correction processing on the second image signal. Specifically, the purpose of performing color correction processing on the second image signal is to make the second image signal have a more accurate color effect.

The contrast processing unit is configured for performing contrast processing on the third image signal. Specifically, the purpose of performing contrast processing on the third image signal is to make the third image signal have a penetrating-haze effect, that is, image transparency.

As described above, the system for processing image signals of the present invention is described in detail, and the monitoring requirements in low illumination environment, haze environment and low illumination and haze environment can be meet by obtaining color information and brightness information from the image signals and combining the color information and the brightness information to generate a synthesized image having a plurality of advantages.

As described above, the present application provides a method and system for processing image signals. The present application obtains a plurality of photosensitive signals by sensing different bands, to generate a fill light control signal based on the gain of images to control the infrared fill light. Performing infrared fill light, time synchronization and image registration on the plurality of photosensitive signals, and the photosensitive signals after performing infrared fill light, time synchronization and image registration are synthesized to generate a synthesized image having multiple advantages. Finally, the synthesized image is outputted.

The synthesized image has many advantages. In low illumination environment, it can generate a monitoring image with small noise and rich color, and can meet the monitoring requirements in low illumination environment. In the case of haze, it can generate a monitoring image with rich color and a better penetrating-haze effect, and can meet the monitoring requirements in the haze environment. In the case of low illumination and haze, it can generate a monitoring image with small noise, rich colors and better penetrating-haze effect, and can meet the two monitoring requirements of low illumination and haze which are focused in the field of security.

Figure 11:
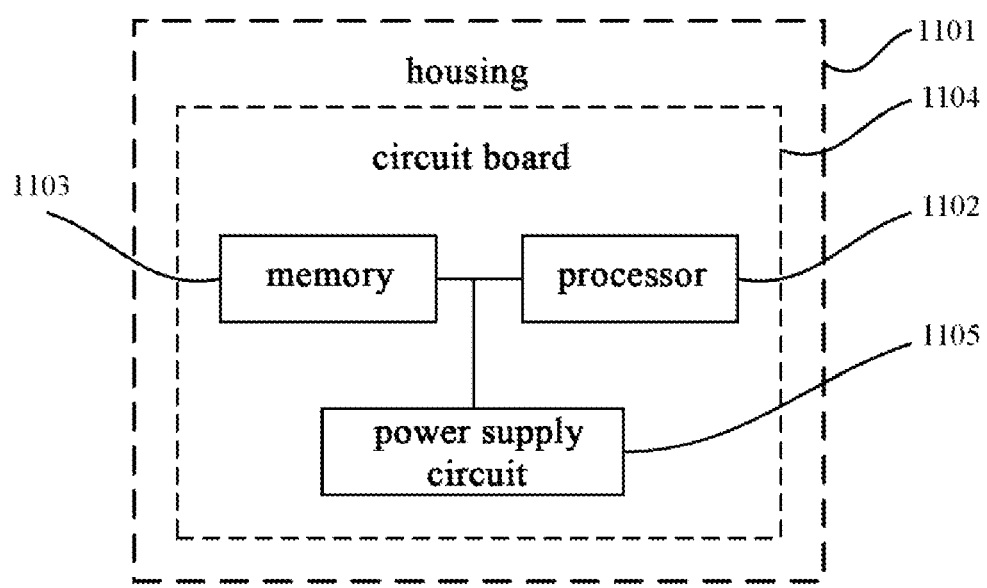
FIG. 11 is a schematic structural view of an electronic device of an optional embodiment of the present application.

As shown in FIG. 11, the present embodiment also provides an electronic device, including a housing 1101, a processor 1102, a memory 1103, a circuit board 1104, and a power supply circuit 1105, wherein the circuit board 1104 is disposed within a space surrounded by the housing 1101, the processor 1102 and the memory 1103 are provided on the circuit board 1104; the power supply circuit 1105 is configured for supplying power to various circuits or devices; the memory 1103 is configured for storing executable program code; and the processor 1102 runs a program corresponding to the executable program code by reading the executable program code stored in the memory 1103 for executing the method for processing the image signals provided by the embodiment of the present application; wherein the method for processing the image signals could include:

sensing visible light bands of optical signals in an area to be imaged, via a first imaging unit, to generate a first image signal, and the first image signal includes color information;

sensing at least infrared bands of optical signals in the area to be imaged, via the second imaging unit, to generate a second image signal, and the second image signal includes brightness information;

synthesizing the first image signal and the second image signal to generate a synthesized image with color information and brightness information.

Specifically, the electronic device may be a camera or a device having a sensing function and an image signal processing function, and the present application is not limited thereto.

In the present embodiment, the processor in the electronic device runs a program corresponding to the executable program code by reading the executable program code stored in the memory, and the above method for processing image signals is performed when the executable program code being running Therefore, a synthesized image with a variety of advantages can be generated to meet the two monitoring requirements in low illumination and haze environment which are focused in the field of security.

The present application embodiment further provides a storage medium for storing executable code, the method for processing image signals is performed when the executable program code being running, wherein the method for processing image signals could include:

sensing visible light bands of optical signals in an area to be imaged, via a first imaging unit, to generate a first image signal, and the first image signal includes color information;

sensing at least infrared bands of optical signals in the area to be imaged, via the second imaging unit, to generate a second image signal, and the second image signal includes brightness information;

synthesizing the first image signal and the second image signal to generate a synthesized image with color information and brightness information.

In the present embodiment, the storage medium stores executable code which executing the above method for processing image signals when being running. Therefore, a synthesized image with a variety of advantages can be generated to meet the two monitoring requirements in low illumination and haze environment which are focused in the field of security.

For the electronic device and the storage medium embodiment, since the method content related to them is substantially similar to the method embodiment described above, the descriptions of which are relatively simple, and the related parts of which could refer to the part of the method embodiment.

It should be understood that the above specific embodiments of the present application are only used to exemplary illustrate or explain the principles of the present application, and are not intended to limit the present application. Therefore, any modifications, equivalent substitutions, improvements and the like without departing from the spirit and the scope of the present application are intended to be included within the scope of the present application. Furthermore, the appended claims are intended to cover all changes and modified examples that fall within the scope and bounds or equivalents of such scope and bounds of the appended claims.

The invention claimed is:

1. A method for processing image signals, comprising:
sensing visible light bands of optical signals in an area to be imaged, via a first imaging unit, to generate a first image signal, wherein the first image signal comprises color information;
sensing at least infrared bands of optical signals in the area to be imaged, via a second imaging unit, to generate a second image signal, wherein the second image signal comprises brightness information;
synthesizing the first image signal and the second image signal to generate a synthesized image with color information and brightness information;
wherein the step of synthesizing the image signals comprises:
  performing infrared fill light on the image signals to compensate for brightness;
  performing signal synchronization on the image signals to compensate for imaging time difference;
  performing image registration on the image signals to compensate for misalignment of the image signals at pixel positions; and
  synthesizing the image signals to generate a synthesized image;
wherein the step of performing the infrared fill light comprises:
  obtaining gain of the image signals;
  judging whether the gain is greater than a first threshold value T1 or less than a second threshold value T2;
  when the gain is greater than the first threshold value T1, enabling the infrared fill light; and
  when the gain is less than the second threshold value T2, disabling the infrared fill light.

2. The method according to claim 1, wherein in case illumination is lower than a preset threshold value, the step of generating the second image signal is performed by sensing the visible light bands and the infrared bands of the optical signals in the area to be imaged.

3. The method according to claim 1, wherein the method further comprises one of the following:
sensing infrared bands of optical signals in the area to be imaged, via a third imaging unit, to generate a third image signal, wherein the third image signal comprises brightness information; and
synthesizing the first image signal and the third image signal to generate a synthesized image;
or
sensing infrared bands of optical signals in the area to be imaged, via a third imaging unit, to generate a third image signal, wherein the third image signal comprises brightness information; and synthesizing the first image signal, the second image signal and the third image signal to generate a synthesized image;

wherein the step of generating the second image signal is performed by sensing the visible light bands and the infrared bands of the optical signals in the area to be imaged.

4. The method according to claim 1, wherein the step of synthesizing comprising:

calculating a color saturation estimation value of the second image signal and calculating a first weight of the first image signal based on the color saturation estimation value;

calculating a noise estimation value of the first image signal and calculating a second weight of the second image signal based on the noise estimation value; and synthesizing the first and second image signals by weighted averaging based on the first image signal and the first weight and the second image signal and the second weight to generate a synthesized image.

5. The method according to claim 3, wherein the step of synthesizing the first image signal and the third image signal comprising:

calculating a haze density estimation value of the first image signal and calculating a third weight of the third image signal based on the haze density estimation value;

calculating a first weight of the first image signal based on the third weight;

synthesizing the first image signal and the third image signal by weighted averaging based on the first image signal and the first weight and the third image signal and the third weight to generate a synthesized image; or the step of synthesizing the first image signal, the second image signal and the third image signal comprising:

calculating a color saturation estimation value of the second image signal and calculating a first weight of the first image signal based on the color saturation estimation value;

calculating a noise estimation value of the first image signal and calculating a second weight of the second image signal based on the noise estimation value;

calculating a haze density estimation value of the first image signal and calculating a third weight of the third image signal based on the haze density estimation value;

synthesizing the first image signal, the second image signal and the third image signal by weighted averaging based on the first image signal and the first weight, the second image signal and the second weight and the third image signal and the third weight to generate a synthesized image.

6. The method according to claim 4, wherein:
the first weight is calculated according to the following formula:

$$\begin{cases} sat = \frac{\max(r, g, b) - \min(r, g, b)}{\max(r, g, b)} \\ w1 = 1 - sat \end{cases},$$

r represents red, g represents green, b represents blue, and the values of r, g, b range between 0 and 255; sat represents the color saturation estimation value of the second image signal, w1 represents the first weight of the first image signal;

the second weight is calculated according to the following formula:

$$w2 = \frac{\min(\text{abs}(\text{noise}), thr_1)}{thr_1},$$

w2 represents the second weight of the second image signal, noise represents the noise estimation value of the first image signal, $thr_1$ represents an empirical constant for calculating the second weight w2.

7. The method according to claim 5, wherein the third weight is calculated according to the following formula:

$$w3 = \frac{\min(\text{abs}(ds), thr_2)}{thr_2},$$

w3 represents the third weight of the third image signal, ds represents the haze density estimation value of the first image signal, $thr_2$ represents an empirical constant for calculating the third weight w3.

8. The method according to claim 1, wherein the step of performing signal synchronization on the image signals comprising:

caching a predetermined number of frames;

performing frame-compensation on the image signals based on the cached predetermined number of frames so as to make them to be synchronized in time.

9. The method according to claim 1 wherein the step of performing image registration on the image signals comprising:

obtaining an affine transformation matrix by calibration;

performing affine transformation on the image signals based on the affine transformation matrix to register the images thereof.

10. An electronic device, which comprises:

one or more processors, one or more memories, wherein the one or more memories are configured to store executable program codes; the executable program codes stored in the one or more memories are executed by the one or more processors to perform:

sensing visible light bands of optical signals in an area to be imaged, via a first imaging unit, to generate a first image signal, wherein the first image signal comprises color information;

sensing at least infrared bands of optical signals in the area to be imaged, via a second imaging unit, to generate a second image signal, wherein the second image signal comprises brightness information; and synthesizing the first image signal and the second image signal to generate a synthesized image with color information and brightness information;

wherein the operation of synthesizing the image signals comprises:

performing infrared fill light on the image signals to compensate for brightness;

performing signal synchronization on the image signals to compensate for imaging time difference;

performing image registration on the image signals to compensate for misalignment of the image signals at pixel positions; and synthesizing the image signals to generate a synthesized image;
wherein the operation of performing the infrared fill light comprises:
obtaining gain of the image signals;
judging whether the gain is greater than a first threshold value T1 or less than a second threshold value T2;
when the gain is greater than the first threshold value T1, enabling the infrared fill light; and
when the gain is less than the second threshold value T2, disabling the infrared fill light.

11. The electronic device according to claim 10, wherein the executable program codes stored in the one or more memories are executed by the one or more processors to perform:
generating the second image signal is performed by sensing the visible light bands and the infrared bands of the optical signals in the area to be imaged, in case illumination is lower than a preset threshold value.

12. The electronic device according to claim 10, wherein the executable program codes stored in the one or more memories are executed by the one or more processors to perform:
sensing infrared bands of optical signals in the area to be imaged, via a third imaging unit, to generate a third image signal, wherein the third image signal comprises brightness information; and
synthesizing the first image signal and the third image signal to generate a synthesized image;
or
sensing infrared bands of optical signals in the area to be imaged, via a third imaging unit, to generate a third image signal, wherein the third image signal comprises brightness information; and
synthesizing the first image signal, the second image signal and the third image signal to generate a synthesized image;
wherein the step of generating the second image signal is performed by sensing the visible light bands and the infrared bands of the optical signals in the area to be imaged.

13. The electronic device according to claim 10, wherein the executable program codes stored in the one or more memories are executed by the one or more processors to perform:
calculating a color saturation estimation value of the second image signal and calculating a first weight of the first image signal based on the color saturation estimation value;
calculating a noise estimation value of the first image signal and calculating a second weight of the second image signal based on the noise estimation value;
synthesizing the first and second image signals by weighted averaging based on the first image signal and the first weight and the second image signal and the second weight to generate a synthesized image.

14. The electronic device according to claim 12, wherein the executable program codes stored in the one or more memories are executed by the one or more processors to perform:
calculating a haze density estimation value of the first image signal and calculating a third weight of the third image signal based on the haze density estimation value;
calculating a first weight of the first image signal based on the third weight;
synthesizing the first image signal and the third image signal by weighted averaging based on the first image signal and the first weight and the third image signal and the third weight to generate a synthesized image;
or
wherein the executable program codes stored in the one or more memories are executed by the one or more processors to perform:
calculating a color saturation estimation value of the second image signal and calculating a first weight of the first image signal based on the color saturation estimation value;
calculating a noise estimation value of the first image signal and calculating a second weight of the second image signal based on the noise estimation value;
calculating a haze density estimation value of the first image signal and calculating a third weight of the third image signal based on the haze density estimation value;
synthesizing the first image signal, the second image signal and the third image signal by weighted averaging based on the first image signal and the first weight, the second image signal and the second weight and the third image signal and the third weight to generate a synthesized image.

15. The electronic device according to claim 14, wherein the executable program codes stored in the one or more memories are executed by the one or more processors to perform:
calculating the first weight according to the following formula:

$$\begin{cases} sat = \dfrac{\max(r, g, b) - \min(r, g, b)}{\max(r, g, b)}, \\ w1 = 1 - sat \end{cases}$$

r represents red, g represents green, b represents blue, and the values of r, g, b range between 0 and 255; sat represents the color saturation estimation value of the second image signal, w1 represents the first weight of the first image signal;
calculating the second weight according to the following formula:

$$w2 = \dfrac{\min(\mathrm{abs}(noise), thr_1)}{thr_1},$$

w2 represents the second weight of the second image signal, noise represents the noise estimation value of the first image signal, $thr_1$ represents an empirical constant for calculating the second weight w2.

16. The electronic device according to claim 15, wherein the executable program codes stored in the one or more memories are executed by the one or more processors to perform:
calculating the third weight according to the following formula:

$$w3 = \dfrac{\min(\mathrm{abs}(ds), thr_2)}{thr_2},$$

w3 represents the third weight of the third image signal, ds represents the haze density estimation value of the first image signal, $thr_2$ represents an empirical constant for calculating the third weight w3.

* * * * *